(12) United States Patent
Rymer et al.

(10) Patent No.: US 8,329,793 B2
(45) Date of Patent: Dec. 11, 2012

(54) PLASTICIZED COMPOSITION COMPRISING POLYVINYLBUTYRAL RESIN HAVING CONTROLLED STEREOCHEMISTRY

(75) Inventors: Donald L. Rymer, Little Hocking, OH (US); Nolan K. Read, III, Vienna, WV (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/242,502

(22) Filed: Sep. 23, 2011

(65) Prior Publication Data

US 2012/0016064 A1    Jan. 19, 2012

Related U.S. Application Data

(62) Division of application No. 12/726,439, filed on Mar. 18, 2010, now Pat. No. 8,053,504, which is a division of application No. 10/519,661, filed as application No. PCT/US03/24380 on Aug. 4, 2003, now Pat. No. 7,709,565.

(60) Provisional application No. 60/400,672, filed on Aug. 2, 2002.

(51) Int. Cl.
   C08K 5/41        (2006.01)
   C08F 8/28        (2006.01)
   C08J 3/00        (2006.01)
   C08L 61/00       (2006.01)

(52) U.S. Cl. ........ 524/156; 524/297; 524/284; 524/296; 524/557; 524/166; 524/308; 524/314

(58) Field of Classification Search ................... 524/156, 524/297, 284, 296, 557, 166, 308, 314
   See application file for complete search history.

(56) References Cited

U.S. PATENT DOCUMENTS

| | | | |
|---|---|---|---|
| 3,153,009 A | 10/1964 | Rombach | |
| 4,243,572 A * | 1/1981 | Dages | 524/287 |
| 4,276,351 A | 6/1981 | Phillips | |
| 4,297,262 A * | 10/1981 | Phillips | 524/308 |
| 4,696,971 A | 9/1987 | Degeilh | |
| 5,559,174 A | 9/1996 | Clark et al. | |
| 5,559,175 A | 9/1996 | Kroggel et al. | |
| 5,750,482 A | 5/1998 | Cummings | |
| 5,886,075 A | 3/1999 | Keane et al. | |
| 6,472,054 B1 * | 10/2002 | Aurenty et al. | 428/195.1 |
| 6,541,181 B1 | 4/2003 | Levanon et al. | |
| 6,673,456 B1 | 1/2004 | Kobata et al. | |
| 7,709,565 B2 | 5/2010 | Rymer et al. | |

FOREIGN PATENT DOCUMENTS

| | | |
|---|---|---|
| EP | 0000699 | 8/1981 |
| EP | 0174480 | 3/1986 |
| EP | 0402213 | 12/1990 |
| EP | 402213 A1 * | 12/1990 |
| EP | 0532489 A1 | 3/1993 |
| EP | 0287416 | 7/1994 |
| GB | 923480 | 4/1963 |
| GB | 2290300 A | 12/1995 |
| JP | 58191701 A | 11/1983 |
| JP | 01319506 A | 12/1989 |
| JP | 03-031305 | 2/1991 |
| JP | 931124 | 2/1997 |
| JP | 2980947 B2 | 11/1999 |
| JP | 11310440 | 11/1999 |
| WO | 2004013191 A1 | 2/2004 |

OTHER PUBLICATIONS

PCT International Search Report for International application No. PCT/US03/24380, dated Nov. 27, 2003.
PCT Written Opinion for International application No. PCT/US03/24380, dated Jul. 14, 2004.

* cited by examiner

*Primary Examiner* — Michael M Bernshteyn (57) ABSTRACT

Provided herein is a polyvinylbutyral (PVB) resin having a meso/racemic stereoisomer ratio of from about 2.5 to about 5.0. Further provided herein is a plasticized PVB composition comprising the PVB resin. Manipulation of the PVB stereoisomer ratio can provide an additional method of controlling the physical properties of the PVB composition, in addition to or in lieu of changing additives or otherwise manipulating the PVB composition.

18 Claims, 3 Drawing Sheets

PLASTICIZED COMPOSITION COMPRISING POLYVINYLBUTYRAL RESIN HAVING CONTROLLED STEREOCHEMISTRY

CROSS-REFERENCES TO RELATED APPLICATIONS

This application is a division of U.S. application Ser. No. 12/726,439, filed on Mar. 18, 2010, and issued on Nov. 8, 2011, as U.S. Pat. No. 8,053,504, which in turn is a division of U.S. application Ser. No. 10/519,661, filed on Dec. 27, 2004, and issued on May 4, 2010, as U.S. Pat. No. 7,709,565, which claims priority under 35 U.S.C. §365 to International Appln. No. PCT/US2003/024380, filed on Aug. 4, 2003, which in turn claims priority under 35 U.S.C. §365 to U.S. Provisional Appln. No. 60/400,672, filed on Aug. 2, 2002. Each of the above-identified applications is incorporated herein by reference in its entirety.

BACKGROUND OF THE INVENTION

Plasticized polyvinyl butyral (PVB) sheet is used in the manufacture of laminate structures such as, for example: windshields for vehicles including automobiles, motorcycles, boats and airplanes; homes and buildings; shelving in cabinets and display cases; and other articles where structural strength is desirable in a glass sheet.
Conventional PVB sheet typically includes a plasticizer in order to increase the flexibility and processibility of the PVB sheet. Various plasticizers are conventional in the manufacture of PVB. Unfortunately, all plasticizers are not equally compatible with PVB. For example triethyleneglycol di-(2-ethyl hexanoate) (3GO), while offering some process advantages over other plasticizers, is not as compatible with PVB as, for example, dibutyl sebacate (DBS) or dihexyl adipate (DHA) or tetraethylene glycol di(2-heptanoate) (4G7). It is known, however, that the compatibility of a particular plasticizer in PVB can be increased by reducing the hydroxyl number of the PVB.

Manufacturers of PVB looking to improve the process of manufacturing PVB and/or improve the performance of PVB in the various applications can face problems caused by changes to the composition of the polymer, or changes in the manufacturing process. In making such changes the performance of the product can be affected in ways that can result in unexpected problems.

In order to make product that is of consistent quality and useful in many of the applications described hereinabove, a PVB manufacturer typically monitors the performance of the product in various tests. For example, PVB should have acceptable tensile creep, impact resistance, haze, color, melt flow rate, and adhesion (for example, to glass). In making any changes to the composition of PVB or to the manufacturing process, the properties listed above should all remain acceptable for the product to be commercially acceptable and viable.

However, changing process parameters in a manufacturing facility is not always trouble-free. While evaluating the feasibility of making a change in the identity of the plasticizer used in their PVB manufacturing process, the Applicants encountered several problems. One problem encountered by the Applicants was that when changing the formulation of PVB by lowering the hydroxyl number in order to increase the compatibility of 3GO with PVB, an unexpected change in the tensile creep properties of the PVB was observed. Due to the nature of the change, the Applicants were not convinced that the PVB would be acceptable for commercial sale into applications wherein toughness and high impact resistance were important factors. While it was still desirable to lower the hydroxyl number of the PVB, the Applicants were faced with maintaining the above physical properties, particularly the tensile creep, of the PVB at a desirable level. Polyvinyl butyral is capable of stereoisomerism, due to the cyclic structures formed by the reaction of polyvinyl alcohol (PVA) with butyraldehyde. In EP 0402213 the ratio of the meso cyclic structure to the racemic cyclic structure in the PVB resin is related to the rigidity of the plasticized PVB sheeting. The recognition of the relationship of the stereoisomerism in PVB resin to the physical properties of plasticized PVB sheeting has not been fully appreciated in the patent literature. Further it has not been recognized or fully appreciated that critical physical properties of PVB sheeting can be manipulated by controlling the stereoisomerism of the PVB resin. Even further, a method for controlling the stereoisomerism of PVB resin during the manufacturing process has not been recognized or, at least, not fully appreciated in the art of PVB manufacture.

In the manufacture of PVB, it can be desirable to have a process for preparing plasticized PVB sheet whereby critical physical properties of the sheet can be controlled in spite of changing the manufacturing process for PVB, or the composition of the PVB resin used to make a PVB sheet, or a change in other components used to make the PVB sheet.

SUMMARY OF THE INVENTION

In one aspect, the present invention is a plasticized polyvinylbutyral composition having a tensile creep of less than 3.0 and a PVB resin hydroxyl number of from about 15 to about 34, wherein the PVB composition comprises (a) a mixture of meso and racemic stereoisomers wherein the ratio of meso to racemic stereoisomers (M/R) is in the range of from about 2.5 to about 5.0 in the PVB resin and (b) plasticizer in an amount of from about 30 to about 50 parts per hundred (pph) based on the dry resin weight of the PVB polymer, and wherein the PVB resin is obtained by a process wherein a surfactant in an amount of from about 0.1 wt % to about 0.70 wt % based on the dry weight of the PVA is used. In still another aspect, the present invention is a plasticized polyvinylbutyral composition having a tensile creep less than 1.5, hydroxyl number of from about 17 to about 19, wherein the PVB comprises (a) a mixture of meso and racemic stereoisomers wherein the ratio of meso to racemic stereoisomers (M/R) is in the range of from about 3.1 to about 3.5 and (b) plasticizer in an amount of from about 30 to about 50 parts per hundred (pph) PVB, wherein the surfactant is selected from: sodium dioctylsulfosuccinate, sodium methyl cocoyl taurate, sodium lauryl sulfate, or mixtures thereof.

In another aspect the present invention is a process for preparing a PVB resin composition having a mixture of meso and racemic stereoisomers, the process comprising the steps: (a) mixing components (i) through (v) to obtain an aqueous reaction mixture (RM); and, (b) stirring RM for a period of from about 15 minutes to about 180 minutes at a temperature in the range of from about 5° C. to about 100° C. to obtain the PVB resin composition, wherein the components of RM are (i) water, (ii) an acidic aqueous polyvinyl alcohol solution having a dry weight PVA concentration of from about 8 wt % to about 20 wt %, based on the total weight of the solution, that is maintained at a temperature of at least about 80° C., (iii) an acid compound or mixture of acid compounds present in an amount sufficient to give RM a pH of from about 1.3 to about 2.5; (iv) a surfactant or a mixture of surfactants present in an amount of from about 0.1 wt % to about 0.70 wt % based on the dry weight of the PVA, and (v) butyraldehyde, wherein the ratio of (ii) to (v) is sufficient such that there is unreacted hydroxyl functionality in the PVB resin composition, and wherein the PVB resin composition has a hydroxyl number of from about 15 to about 34 and further wherein the meso to racemic ratio (M/R) of the PVB composition is in the range of from about 2.5 to about 5.0. In another aspect the present invention is a process for preparing a PVB resin composition comprising a mixture of meso and racemic stereoisomers, the meso to racemic ratio (M/R) of the PVB composition being in the range of from about 2.5 to about 5.0, the process comprising the steps: (a) mixing (i) water; (ii) polyvinyl alcohol of one or more degrees of polymerization dissolved in water and acid(s) at a temperature of at least 80° C. with a PVA concentration of 8 to 20 weight percent; (iii) acid or mixture of acids wherein the acids are phosphoric acid, sulfuric acid, and/or paratoluene sulfonic acid to obtain a solution pH of from about 1.3 to 2.5; (iv) surfactant or mixture of surfactants wherein the surfactants are sodium dioctylsulfosuccinate, sodium methyl cocoyl taurate, and/or sodium lauryl sulfate in an amount of from about 0.1 wt % to about 0.70 wt % based on the dry weight of the PVA used in the recipe; and (v) butyraldehyde wherein the ratio of (ii) to (v) is sufficient to obtain a PVB resin having a hydroxyl number of from about 15 to about 34; and (b) stirring the mixture for a period of from about 15 minutes to about 180 minutes at a temperature in the range of from about 5° C. to about 100° C. to obtain the PVB resin.

In still another aspect the present invention is a process for preparing a plasticized PVB composition comprising the steps: (a) admixing (i) water; (ii) polyvinyl alcohol of one or more degrees of polymerization dissolved in water and acid(s) at a temperature of at least 80° C. with a PVA concentration of 8 to 20 weight percent; (iii) acid or mixture of acids to obtain a solution pH of from about 1.3 to 2.5; (iv) surfactant in an amount of from about 0.1 wt % to about 0.70 wt % based on the dry weight of the PVA used in the recipe; (v) butyraldehyde wherein the ratio of (ii) to (v) is sufficient to obtain a PVB resin having a hydroxyl number of from about 15 to about 34; (b) stirring the mixture for a period of from about 15 minutes to about 180 minutes at a temperature in the range of from about 5° C. to about 100° C.; (c) stabilizing the mixture by (i) raising the pH of the mixture to a pH of at least 7; (ii) draining the liquid from the mixture; and (iii) washing the PVB with neutral pH water to obtain a PVB resin wherein the resin comprises a mixture of meso and racemic stereoisomers, the meso to racemic ratio (M/R) of the mixture being in the range of from about 2.5 to about 5.0; (d) mixing the resin with a plasticizer in an amount of from about 30 to about 50 pph, based on the weight of the dry PVB resin; and (e) extruding the plasticized PVB wherein the tensile creep of the resulting sheeting is less than 2.5.

In another aspect the present invention is a process for preparing a plasticized PVB composition comprising the steps: (a) admixing (i) water; (ii) polyvinyl alcohol of one or more degrees of polymerization dissolved in water and acid(s) at a temperature of at least 80° C. with a PVA concentration of 8 to 20 weight percent; (iii) acid or mixture of acids wherein the acids are phosphoric acid, sulfuric acid, and/or paratoluene sulfonic acid to obtain a solution pH of from about 1.3 to 2.5; (iv) surfactant or mixture of surfactants wherein the surfactants are sodium dioctylsulfosuccinate, sodium methyl cocoyl taurate, and/or sodium lauryl sulfate in an amount of from about 0.1 wt % to about 0.70 wt % based on the dry weight of the PVA used in the recipe; (v) butyraldehyde wherein the ratio of (ii) to (v) is sufficient to obtain a PVB resin having a hydroxyl number of from about 15 to about 34; (b) stirring the mixture for a period of from about 15 minutes to about 180 minutes at a temperature in the range of from about 5° C. to about 100° C. (c) stabilizing the mixture by (i) raising the pH of the mixture to a pH of at least 7; (ii) draining the liquid from the mixture; and (iii) washing the PVB with neutral pH water to obtain a PVB resin wherein the resin comprises a mixture of meso and racemic stereoisomers, the meso to racemic ratio (M/R) of the mixture being in the range of from about 2.5 to about 5.0; (d) mixing the resin with plasticizer in an amount of from about 30 to about 50 pph, based on the weight of the dry PVB resin; and (e) extruding the plasticized PVB wherein the tensile creep of the resulting sheeting is less than 2.5.

In another aspect the present invention is a process for preparing a plasticized PVB composition comprising the steps: (a) admixing (i) water; (ii) polyvinyl alcohol of one or more degrees of polymerization dissolved in water and acid(s) at a temperature of at least 80° C. with a PVA concentration of 8 to 20 weight percent; (iii) acid or mixture of acids wherein the acids are phosphoric acid, sulfuric acid, and/or paratoluene sulfonic acid to obtain a solution pH of from about 1.3 to 2.5; (iv) surfactant or mixture of surfactants wherein the surfactants are sodium dioctylsulfosuccinate, sodium methyl cocoyl taurate, and/or sodium lauryl sulfate in an amount of from about 0.1 wt % to about 0.70 wt % based on the dry weight of the PVA used in the recipe; (v) butyraldehyde wherein the ratio of (ii) to (v) is sufficient to obtain a PVB resin having a hydroxyl number of from about 15 to about 34; (b) stirring the mixture for a period of from about 15 minutes to about 180 minutes at a temperature in the range of from about 5° C. to about 100° C.;
(c) stabilizing the mixture by (i) raising the pH of the mixture to a pH of at least 7; (ii) draining the liquid from the mixture; and (iii) washing the PVB with neutral pH water to obtain a PVB resin wherein the resin comprises a mixture of meso and racemic stereoisomers, the meso to racemic ratio (M/R) of the mixture being in the range of from about 2.5 to about 5.0; (d) mixing the resin with 3GO, 4G7, or DBS in an amount of from about 30 to about 50 pph, based on the weight of the dry PVB resin; and (e) extruding the plasticized PVB wherein the tensile creep of the resulting sheeting is less than 2.5.

DETAILED DESCRIPTION OF THE INVENTION

In one embodiment, the present invention is a plasticized PVB composition comprising from about 30 to about 50 pph (based on the weight of the dry PVB resin) of a plasticizer, having a tensile creep less than or equal to 3.0, having a PVB resin hydroxyl number of from about 15 to about 34, and having a PVB resin meso/racemic stereoisomer ratio within the range of from about 2.5 to about 5.0. PVB resin can be manufactured according to conventional and known processes. For example, U.S. Pat. No. 3,153,009 describes a process for commercial manufacture of PVB resin.

Figure 1:
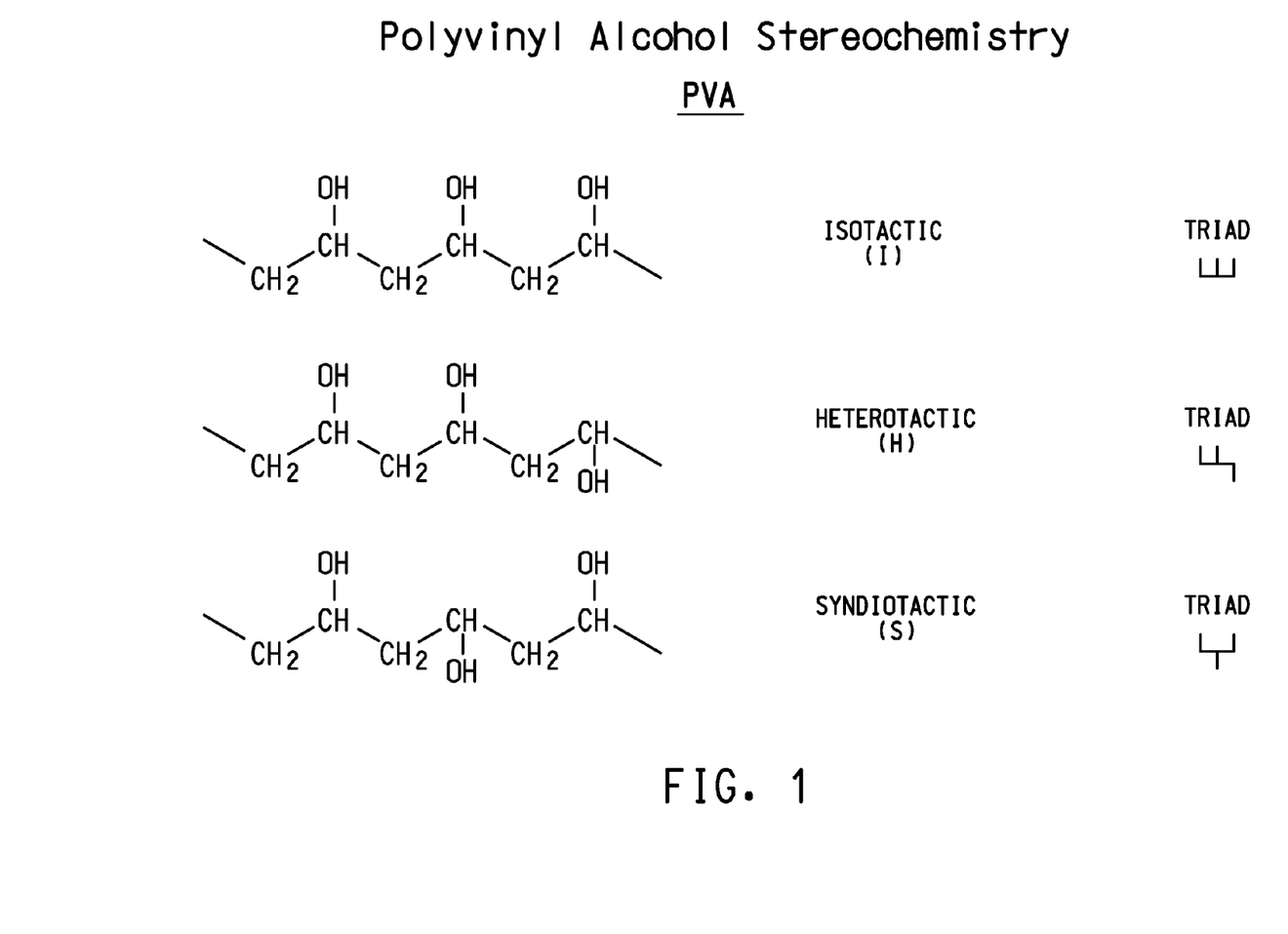
FIG. 1 depicts the structures of the isotactic, heterotactic and syndiotactic forms of polyvinyl alcohol.
Figure 2:
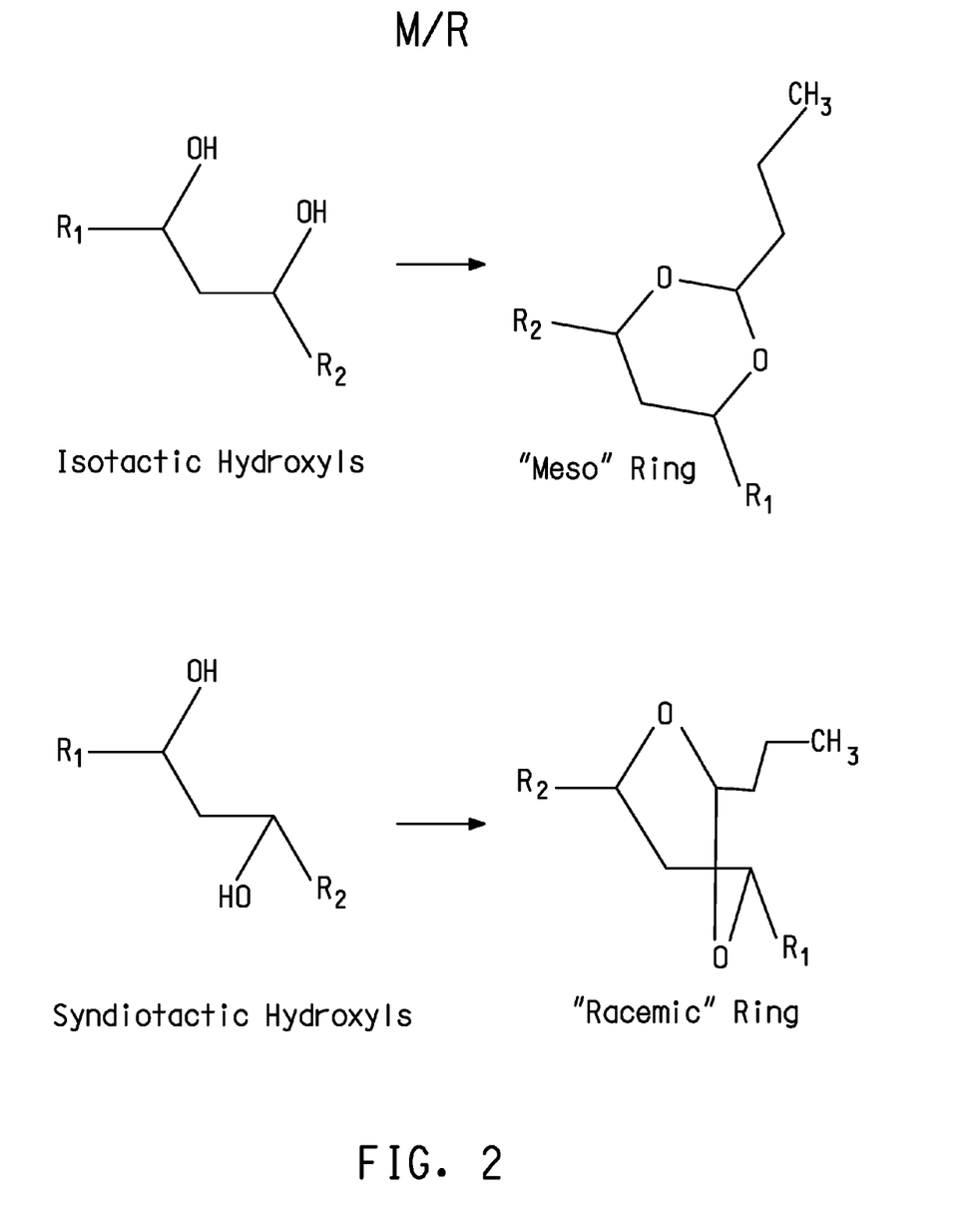
FIG. 2 depicts the structures of the meso and racemic forms of polyvinyl butyral.

An improved PVB resin, for the purposes of the Applicants' process, can be prepared by mixing one or more polyvinyl alcohol polymers, differing in degree of polymerization, with butyraldehyde in an aqueous medium in the presence of an acid or mixture of acids, at a temperature of from about 5° C. to about 100° C. The improvements obtained by the Applicants in the practice of the present invention are in part due to the recognition and use of the fact that PVA exists in three forms: (1) syndiotactic; (2) isotactic; and (3) heterotactic. When PVA is condensed with butyraldehyde to form the cyclic acetals of PVB, the cyclic structures can be in either the meso or racemic forms. PVB typically includes a mixture of the two stereoisomers. The meso form of PVB is derived from isotactic PVA, the racemic form of PVB is derived from syndiotactic PVA, and the hetero form of PVA results in a mixture of PVB meso and racemic forms depending on the neighboring hydroxyl stereochemistry where the stereochemistry of PVA is represented as triads of the three stereochemistry forms. The syndiotactic and isotactic forms of PVA, and the meso and racemic forms of PVB are shown in FIGS. 1 and 2 herein.

In the process of the present invention the hydroxyl number and meso to racemic ratio are manipulated to control some of the physical properties of a PVB sheet. The Applicants have identified some physical properties of PVB that are affected by the meso/racemic stereoisomer ratio, denoted herein by "M/R". While the Applicants do not suggest or maintain that these physical properties are only affected by the M/R ratio, the Applicants have determined that the M/R ratio is an important factor in determining these physical properties. One of the physical properties affected by the M/R ratio includes tensile creep, which is reported herein as the logarithm (log) of the percentage of elongation in an extruded sheet of PVB against the pull exerted by a weight clamped to the sheet. For the purposes of the present invention, suitable plasticized PVB will have values for tensile creep within the ranges disclosed herein. The tensile creep of an extruded sheet of the present invention is less than 3.0. Preferably the range for tensile creep is less than or equal to 2.5. More preferably, the tensile creep is less than or equal to 1.5.

In the production of PVB, the ratio of PVA to butyraldehyde can be chosen such that the PVB has residual hydroxyl functionality, conventionally reported as hydroxyl number (OH number). One factor that can affect the M/R ratio of PVB is the hydroxyl number of the PVB composition. Residual hydroxyl functionality can be varied according to what properties are desirable in the PVB. The relative amounts of butyraldehyde and PVA required to obtain a particular value for the OH number in the PVB resin will be readily apparent to those skilled in the art of PVB manufacture. In the practice of the present invention residual hydroxyl to produce a PVB suitable for the practice of the present invention can yield an OH number in the range of from about 15 to about 34. Preferably, the OH number is from about 15 to about 30. More preferably, the OH number is from about 17 to about 20, and most preferred in the practice of the present invention is PVB resin having an OH number in the range of from about 17 to about 19.5. The OH number can be determined according to standard methods such as ASTM D1396-92.

Figure 3:
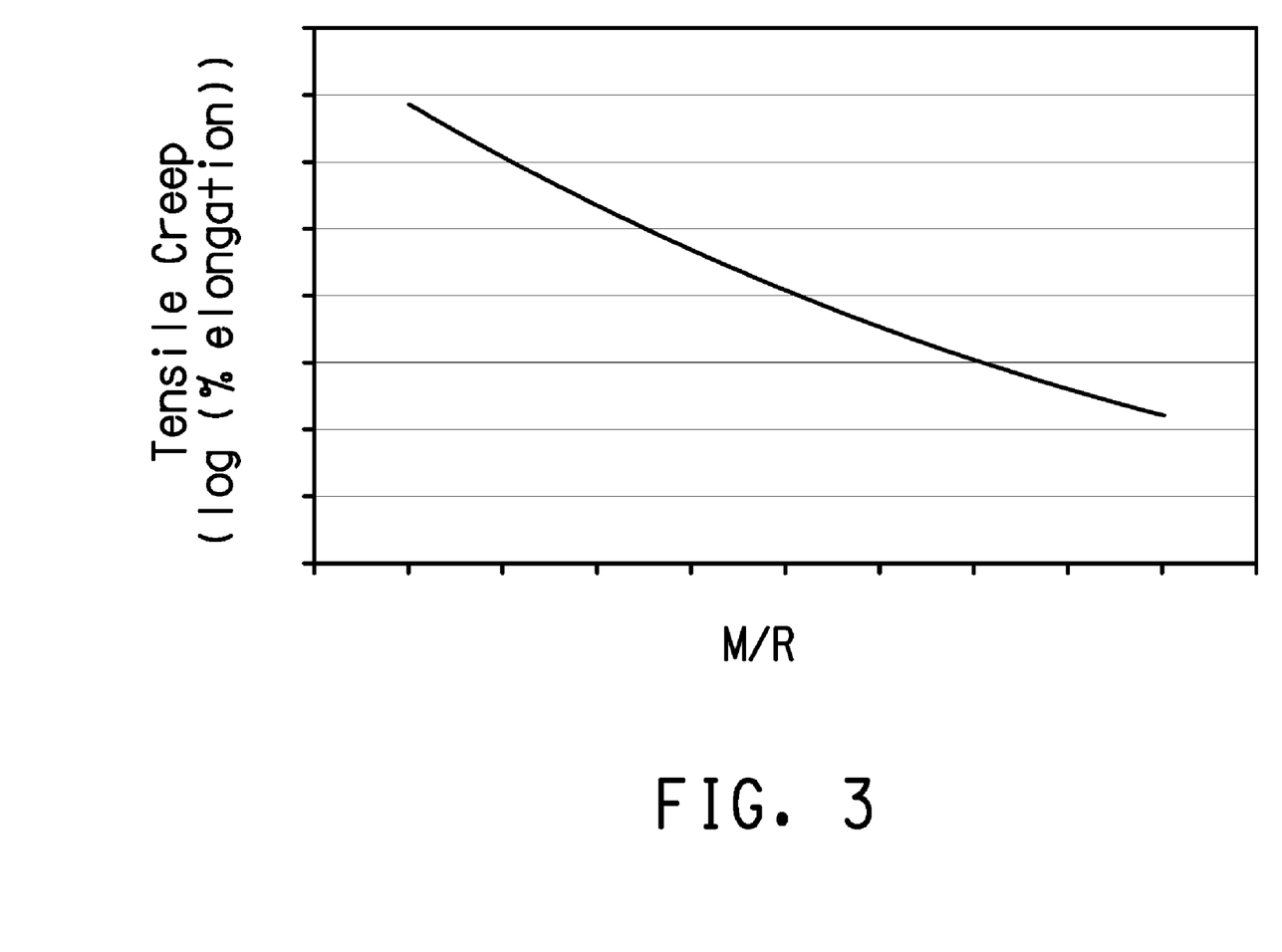
FIG. 3 is a graph showing the relationship between the M/R ratio and the tensile creep of a polyvinyl butyral composition.

For a PVB composition having an OH number in the range of from about 15 to about 34, it is desirable that the PVB should have a M/R ratio of from about 2.5 to about 5.0. Preferably, the M/R should be within the range of from about 2.8 to about 3.6. More preferably the M/R should be within the range of from about 3.1 to about 3.5, and most preferably in the range of from about 3.2 to about 3.4. Outside of the ranges described herein, the physical properties of the PVB composition may not be suitable, or controllable as described under the practice of the present invention. The M/R ratio can be determined by nuclear magnetic resonance spectroscopy (NMR), using either or both proton magnetic resonance or $^{13}C$ magnetic resonance techniques. Without being held to theory, there appears to be a relationship between the M/R ratio and tensile creep, as depicted in FIG. 3.

The present invention requires the use of a surfactant. Surfactants suitable for use herein include many of the conventionally known surfactants, such as, for example: sodium lauryl sulfate; ammonium lauryl sulfate; sodium dioctyl sulfosuccinate; ammonium perfluorocarboxylates having from 6 to 12 carbon atoms; sodium aryl sulfonates, adducts of chlorinated cyclopentadiene and maleic anhydride; partially neutralized polymethacrylic acid; alkylaryl sulfonates; sodium N-oleyl-N-methyl taurate; sodium alkylaryl polyether sulfonates; triethanolamine lauryl sulfate; diethyl dicyclohexyl ammonium lauryl sulfate; sodium secondary-alkyl sulfates; sulfated fatty acid esters; sulfated aryl alcohols; and the like. Preferable surfactants include sodium lauryl sulfate (SLS), sodium dioctyl sulfocuccinate, sodium methyl cocoyl taurate, and decyl(sulfophenoxy)benzenesulfonic acid disodium salt. Most preferable are sodium dioctyl sulfosuccinate (DOSS) and sodium methyl cocoyl taurate (COCO). Mixtures or combinations of surfactants described herein can be useful in the practice of the present invention.

The surfactant or mixture of surfactants can be included in any effective amount for the particular set of process conditions practiced. The Applicants have found that an effective amount is at least 0.1 weight percent (wt %), based on the dry weight of PVA. For example, the surfactant can be included in an amount of from about 0.10 to about 0.70 wt %. Preferably the surfactant is included in an amount of from about 0.12 to about 0.68 wt %. More preferably, the surfactant is included in an amount of from about 0.15 to about 0.60 wt %. Most preferably, the surfactant is included in an amount of from about 0.20 to about 0.50 wt %. The process of the present invention requires an acidic reaction mixture. The acid or mixture of acids useful herein can be any organic or inorganic acid or acids which are able to raise or lower, as the case may be, the pH of the reaction mixture to within a pH range of from about 1.3 to about 2.5. Preferable acids include phosphoric acid, sulfuric acid, and para toluene sulfonic acid, for example.

There is a broad temperature range within which the process of the present invention can be practiced. In the practice of the present invention, the reaction temperature is preferably in the range of from about 5° C. to about 100° C. The preferred temperature range is from about 80° C. to about 100° C.

In the practice of the present invention, one or more PVA types can be useful in preparing PVB having the desirable M/R ratio. By "PVA types", it is meant PVA of various degrees of polymerization. The preferred PVAs include a PVA with degree of polymerization of approximately 1005 and a PVA with degree of polymerization of approximately 618. It is understood herein that PVA, as the term is used herein, can refer to one or more PVA types.

In the practice of the present invention, PVA is used as an aqueous solution. The concentration of the PVA in water, on a weight percent (wt %) basis, is based on the weight of the dry PVA to the total weight of the solution. An aqueous PVA solution preferably has a PVA concentration in the range of from about 8 wt % to about 20 wt %. The PVA and butyraldehyde (BA) can be mixed by any conventional mixing means, for example by a motorized mechanical stirrer, for a period of from about 0.25 to about 3.0 hours. In the practice of the present invention, it is preferable that the PVA and BA are mixed for from about 0.5 to about 2.0 hours. If the mixing is not carried out for a long enough time, incomplete reaction will occur, yielding a PVB with a hydroxyl number higher than the desirable upper range limit. Very long mixing times are not desirable since they increase cycle time and decrease the amount of product which can be produced. The pH of the PVA/BA reaction mixture is initially below a pH of about 2.5. After mixing for at least about 15 minutes, the pH of the reaction mixture can be raised by addition of an alkaline material to a pH of at least about 7 to stop the reaction of BA and PVA. Preferably the alkaline material is added after about 30 minutes. The reaction mixture can be mixed for about 5 to 60 minutes at the alkaline pH, preferably 10 to 45 minutes. More preferably, the mixture is stirred for 15 to 40 minutes at the alkaline pH, and most preferably for 20 to 30 minutes. The alkaline material can be any suitable conventional alkaline material known in the chemical arts having alkalinity enough to raise the pH to the desired level. For example metal hydroxides, metal oxides, metal carbonates, and/or mixtures of these can be suitable for use herein.

After the PVA and butyraldehyde have been reacted for the desired time, PVB can be isolated by any conventional isolation technique. For example, the aqueous reaction medium can be drained from the PVB and the PVB can be washed free of much of the water-soluble residue from the reaction by rinsing the PVB with pH neutral water. The amount of water and the number of rinses can determine how effective the washing procedure is in removing the water-soluble reaction residue, but at least one rinse using 0.4 gallons of water for each pound of PVB is preferred. Plasticization can be desirable to facilitate the conversion of the resin into an extruded sheet. Plasticization can be carried out using conventional processes. For example, plasticization can be carried out by a process whereby the plasticizer is mixed with a PVB resin aqueous slurry, together with other additives, either prior to or as the mixture is fed into an extruder, as is described in U.S. Pat. No. 3,153,009, for example. Alternatively, plasticization can be carried out by a process whereby the plasticizer is mixed with dried PVB resin flake prior to, or as, the mixture is fed into an extruder as is described in U.S. Pat. No. 5,886,075, for example. Plasticizers of the present invention can be chosen from any that are known or used conventionally in the manufacture of plasticized PVB sheeting compositions. For example, a plasticizer suitable for use herein can be a plasticizer or a mixture of plasticizers selected from the group consisting of: diesters obtained from the chemical reaction of aliphatic diols with carboxylic acids, including diesters of polyether diols or polyether polyols; and, esters obtained from polyvalent carboxylic acids and aliphatic alcohols. For convenience, when describing the sheet compositions of the present invention, a mixture of plasticizers can be referred to herein as "plasticizer". That is, the singular form of the word "plasticizer" as used herein can represent the use of either one plasticizer or the use of a mixture of two or more plasticizers in a given sheet composition. The intended use will be apparent to a reader skilled in the art.

Preferred plasticizers for use herein are diesters obtained by the reaction of triethylene glycol or tetraethylene glycol with aliphatic carboxylic acids having from 6 to 10 carbon atoms; and diesters obtained from the reaction of sebacic acid with aliphatic alcohols having from 1 to 18 carbon atoms. More preferably the plasticizer is either 4G7, 3GO or DBS. Most preferably the plasticizer is 3GO.

Plasticizer can be added in any compatible amount desirable to obtain a plasticized PVB sheet. Plasticizer can be added in an amount of from about 30 to about 50 pph, based upon the total dry weight of the resin. The "dry weight" as used herein refers to the weight of the dry resin, that is, after water has been removed from the resin. Preferably the plasticizer is present in an amount of from about 30 to about 45 pph, and most preferably in an amount of from about 32 to about 45 pph. Optional additives can be included in a resin composition of the present invention without effect on the stereoisomerism of the PVB. Such additives include antioxidants, light stabilizers, adhesion control agents, and/or surface tension controlling agents, as well as other additives. A PVB sheet can be obtained from PVB resin flake described herein by either extrusion or co-extrusion, as is conventionally known in the art. For example, a PVB sheet can be obtained from the PVB resin flake of the present invention by co-extruding the flake, plasticizer, and/or other optional additives at a temperature of from about 175° C. to about 225° C.

EXAMPLES

The following Examples and comparative examples are presented to further illustrate the present invention. The Examples are not intended to limit the scope of the invention in any manner, nor should they be used to define the claims or specification in any manner that is inconsistent with the invention as claimed and/or as described herein.

The following tests were used in the examples and comparative examples below.

Hydroxyl number: ASTM D 1396-92.

Tensile Creep Procedure

A conditioned sample of PVB sheeting is cut to dimensions of 101 cm in the extrusion direction and 19 mm in the transverse direction.

The sample is marked with parallel lines at 1, 3, 7, and 9 cm from one end of the specimen.

The sample is hung vertically in an oven with a clear glass door at 60° for 30 minutes.

At the end of this time the distance between the 3 and 7 centimeter marks are read using a cathetometer.

Attach a weight to the bottom of the specimen sufficient to give a 10 psi load and quickly hang the sample vertically in the oven.

Start a timer and at the end of 30 minutes read the distance between the 3 and 7 centimeter marks.

The tensile creep in % is calculated as:

% Creep=$Lt-Lo/Lo$×100 where $Lo$ is the original gage length and $Lt$ is the final gage length at temperature.

M/R (Meso/Racemic Ratio)

Dissolve 20 milligrams of PVB resin into 1 milliliter of DMSO-d6 at 120° C.

Analyze the sample on a 500 mhz nmr spectrometer by taking at least 16 transients.

Ratio the C—H peaks at 4.5 ppm (meso) and 4.75 ppm (racemic) using an nmr integral function. The ratio of these peaks is referred to as "M/R".

TABLE 1

| Ex | PVA1[a] (parts) | PVA2[b] (parts) | Water (parts) | Surfactant (wt %) | OH # | pH | M/R ratio | Tensile Creep | Plasticizer[c] (pph) |
|---|---|---|---|---|---|---|---|---|---|
| 1 | 32 | 68 | 614 | 0.33% | 18.6 | 2 | 3.65 | 1.33 | 32.3* |
| 2 | 34 | 66 | 648 | 0.15% | 19.45 | | 2.68 | 2.42 | 35.88 |
| 3 | 34 | 66 | 649 | 0.4% | 19.18 | | 2.89 | 2.02 | 38.00 |

TABLE 1-continued

| Ex | PVA1[a] (parts) | PVA2[b] (parts) | Water (parts) | Surfactant (wt %) | OH # | pH | M/R ratio | Tensile Creep | Plasticizer[c] (pph) |
|---|---|---|---|---|---|---|---|---|---|
| 4 | 34 | 66 | 649 | 0.15% | 19.42 | | 2.99 | 2 | 38.31 |
| 5 | 34 | 66 | 642 | 0.30% | 19.11 | | 3.1 | 1.87 | 41.45 |
| 6 | 34 | 66 | 645 | 0.18% | 22.00 | 1.89 | 3.2 | 1.5 | 38.31 |
| 7 | 34 | 66 | 655 | 0.30% | 18.84 | 2.07 | 3.05 | 1.58 | 27.38 |
| 8 | 34 | 66 | 655 | 0.20% | 19.00 | 2.07 | 3.04 | 1.79 | 36.92 |
| 9 | 34 | 66 | 655 | 0.40% | 18.94 | 2.07 | 2.86 | 1.95 | 38.78 |
| 10 | 34 | 66 | 653 | 0.1% | 19.38 | 1.88 | 2.9 | >2.5 | 37.57 |
| 11 | 34 | 66 | 643 | 0.3% | 19..08 | 1.96 | 2.62 | >2.5 | 36.58 |
| 12 | 34 | 66 | 649 | 0.4% | 18.87 | | 3.32 | 1.61 | 36.41 |
| 13 | 34 | 66 | 617 | 0.4% | 18.66 | | 3.6 | | |
| 14 | 32 | 68 | 612 | 0.33% | 19.17 | | 3.62 | | |
| 15 | 32 | 68 | 649 | 0.15% | 22.01 | | 3.45 | 1.33 | ND[1] |
| 16 | 32 | 68 | 636 | 0.33% | 21.92 | | 3.8 | 1.17 | ND |
| 17 | 32 | 68 | 610 | 0.33% | 19.66 | | 3.25 | 1.50 | 30.91* |
| 18 | 32 | 68 | 623 | 0.33% | 19.84 | | 3.35 | 1.28 | ND* |
| 19 | 32 | 68 | 649 | 0.33% | 19.18 | 1.91 | 3.29 | 1.39 | 30.46* |
| 20 | 32 | 68 | 649 | 0.33% | 19.44 | 1.91 | 3.35 | 1.52 | 32.20* |
| 21 | 32 | 68 | 612 | 0.33% | 18.18 | | 3.62 | | |
| 22 | 32 | 68 | 648 | 0.33% | 19.07 | | 3.63 | 1.35 | ND* |
| 23 | 32 | 68 | 614 | 0.33% | 19.27 | | 3.51 | | |
| 24 | 32 | 68 | 649 | 0.33% | 19.88 | 1.98 | 3.36 | 1.39 | ND* |
| 25 | 34 | 66 | 634 | 0.15 | 22.65 | 1.85 | 3.48 | 1.39 | 38.55 |
| 26 | 34 | 66 | 645 | 0.35% | 19.29 | 1.92 | 3.39 | 1.54 | 37.09 |
| 27 | 34 | 66 | 594 | 0.30% | 18.37 | 1.48 | 3.23 | | |
| 28 | 34 | 66 | 594 | 0.60% | 18.02 | 1.48 | 3.37 | | |
| 29 | 32 | 68 | 501 | 0.30% | 18.73 | 1.55 | 3.33 | | |
| 30 | 32 | 68 | 501 | 0.30% | 18.58 | 1.55 | 3.25 | | |
| 31 | 32 | 68 | 461 | 0.30 | 15.74 | 1.50 | 2.94 | | |
| 32 | 32 | 68 | 461 | 0.60% | 17.32 | 1.50 | 3.37 | | |
| 33 | 32 | 68 | 461 | 0.30% | 24.11 | 1.52 | 3.98 | | |
| 34 | 32 | 68 | 461 | 0.30% | 21.64 | 1.52 | 3.56 | | |
| 35 | 0 | 100 | 630 | 0.60% | 17.32 | 1.59 | 3.18 | | |
| 36 | 0 | 100 | 630 | 0.30% | 17.63 | 1.59 | 3.05 | | |
| 37 | 100 | 0 | 630 | 0.60% | 19.44 | 1.60 | 3.89 | | |
| 38 | 100 | 0 | 630 | 0.30% | 18.12 | 1.60 | 3.38 | | |
| 39 | 32 | 68 | 718 | 0.60 | 16.5 | 1.57 | 3.29 | | |
| 40 | 32 | 68 | 718 | 0.30% | 16.66 | 1.57 | 3.16 | | |

[a]PVA with average degree of polymerization approximately equal to 618, commercially available from - - -.
[b]PVA with average degree of polymerization approximately equal to 1005, commercially available from - - -.
[c]Plasticizer is 4G7 unless otherwise noted.
*Plasticizer is 3GO.
[1]ND = Not Determined All of the examples below are referenced in Table 1. Complete description is given for example 1 and subsequent examples are modifications thereof.

Example 1

Poly(vinyl butyral) sheet was prepared as follows: at 90° C., a mixture comprising 32 parts by weight of poly(vinyl alcohol) (PVA) (average degree of polymerization (adp) of approximately 618) and 68 parts by weight of PVA (adp approximately 1005) was dissolved in about 614 parts by weight of demineralized water. To this solution was added 1 part by weight of 88% para-toluene sulfonic acid and enough sulfuric acid to bring the dissolved PVA solution to a pH of 2. Enough n-butyraldehyde to react with the PVA to attain the PVB resin with the hydroxyl number below and 0.33 weight percent DOSS based on the dry PVA weight above were added and the PVA solution was charged into a vessel maintained at 90° C. After a one hour hold time, a slurry was obtained; a surface tension modifier was added to attenuate foam; and the slurry was stabilized with a sodium hydroxide solution to raise the pH to about 11. The slurry was then washed and cooled with demineralized water. A granular, white PVB resin with residual hydroxyl number of 18.6 was obtained. The resin was mixed with 3GO plasticizer containing about 4 grams per liter of a UV blocker and light stabilizer and about 8 grams per liter of an antioxidant and was extruded so that the residence time in the extrusion system was about 15 to 25 minutes to get plasticizer concentration in the sheeting to about 32.3 pph. Adhesion control additives containing magnesium and/or potassium were added in the extruder. Melt temperature measured at the slot die was between 210 and 215° C. M/R for the PVB resin was 3.65 and tensile creep on the sheeting was 1.33.

Example 2

PVB resin was prepared as in Example 1 except for the changes outlined in Table 1: 34 parts of the 618 degree of polymerization PVA, 66 parts of the 1005 degree of polymerization PVA, 648 parts of demineralized water, and 2 parts of pTSA were used to make the dissolved PVA solution; and 0.15 wt % of SLS was used in the place of DOSS as the surfactant. A granular, white PVB resin with residual hydroxyl number of 19.45 was obtained. The PVB composition was formed as in Example 1 except that the plasticizer was 4G7. The resulting plasticizer content was 35.88. The M/R for the PVB resin was 2.68, and tensile creep for the sheeting was 2.42.

Example 3

PVB resin was prepared as in Example 1 except for the changes outlined in Table 1: 34 parts of the 618 degree of polymerization PVA, 66 parts of the 1005 degree of polymerization PVA, 649 parts of demineralized water, and 2 parts of pTSA were used to make the dissolved PVA solution; and 0.4 wt % of SLS was used in the place of DOSS as the surfactant. A granular, white PVB resin with residual hydroxyl number of 19.18 was obtained. The PVB composition was formed as in Example 1 except that the plasticizer was 4G7. The resulting plasticizer content was 38.00. The M/R for the PVB resin was 2.89, and tensile creep for the sheeting was 2.02.

Example 4

PVB resin was prepared as in Example 1 except for the changes outlined in Table 1: 34 parts of the 618 degree of polymerization PVA, 66 parts of the 1005 degree of polymerization PVA, 649 parts of demineralized water, and 1.3 parts of pTSA were used to make the dissolved PVA solution; and 0.15 wt % of DOSS was used as the surfactant. A granular, white PVB resin with residual hydroxyl number of 19.42 was obtained. The PVB composition was formed as in Example 1 except that the plasticizer was 4G7. The resulting plasticizer content was 38.31. The M/R for the PVB resin was 2.99, and tensile creep for the sheeting was 2.0.

Example 5

PVB resin was prepared as in Example 1 except for the changes outlined in Table 1: 34 parts of the 618 degree of polymerization PVA, 66 parts of the 1005 degree of polymerization PVA, 642 parts of demineralized water, and 1.3 parts of pTSA were used to make the dissolved PVA solution; and 0.30 wt % of DOSS was used as the surfactant. A granular, white PVB resin with residual hydroxyl number of 19.11 was obtained. The PVB composition was formed as in Example 1 except that the plasticizer was 4G7. The resulting plasticizer content was 41.45. The M/R for the PVB resin was 3.1, and tensile creep for the sheeting was 1.87.

Example 6

PVB resin was prepared as in Example 1 except for the changes outlined in Table 1: 34 parts of the 618 degree of polymerization PVA, 66 parts of the 1005 degree of polymerization PVA, 645 parts of demineralized water, and 1.3 parts of pTSA were used to make the dissolved PVA solution. Enough sulfuric acid was added to bring the reaction pH to 1.89; and 0.18 wt % of SLS was used as the surfactant. A granular, white PVB resin with residual hydroxyl number of 22.00 was obtained. The PVB composition was formed as in Example 1 except that the plasticizer was 4G7. The resulting plasticizer content was 38.31. The M/R for the PVB resin was 3.2, and tensile creep for the sheeting was 1.5.

Example 7

PVB resin was prepared as in Example 1 except for the changes outlined in Table 1: 34 parts of the 618 degree of polymerization PVA, 66 parts of the 1005 degree of polymerization PVA, 655 parts of demineralized water, and 1.3 parts of pTSA were used to make the dissolved PVA solution. Enough phosphoric acid was added to bring the reaction pH to 2.07; and 0.30 wt % of DOSS was used as the surfactant. A granular, white PVB resin with residual hydroxyl number of 18.84 was obtained. The PVB composition was formed as in Example 1 except that the plasticizer was 4G7. The resulting plasticizer content was 27.38. The M/R for the PVB resin was 3.05, and tensile creep for the sheeting was 1.58.

Example 8

PVB resin was prepared as in Example 1 except for the changes outlined in Table 1: 34 parts of the 618 degree of polymerization PVA, 66 parts of the 1005 degree of polymerization PVA, 655 parts of demineralized water, and 1.3 parts of pTSA were used to make the dissolved PVA solution. Enough phosphoric acid was added to bring the reaction pH to 2.07; and 0.20 wt % of DOSS was used as the surfactant. A granular, white PVB resin with residual hydroxyl number of 19.00 was obtained. The PVB composition was formed as in Example 1 except that the plasticizer was 4G7. The resulting plasticizer content was 36.92. The M/R for the PVB resin was 3.04, and tensile creep for the sheeting was 1.79.

Example 9

PVB resin was prepared as in Example 1 except for the changes outlined in Table 1: 34 parts of the 618 degree of polymerization PVA, 66 parts of the 1005 degree of polymerization PVA, 655 parts of demineralized water, and 1.3 parts of pTSA were used to make the dissolved PVA solution. Enough phosphoric acid was added to bring the reaction pH to 2.07; and 0.4 wt % of SLS was used as the surfactant. A granular, white PVB resin with residual hydroxyl number of 18.94 was obtained. The PVB composition was formed as in Example 1 except that the plasticizer was 4G7. The resulting plasticizer content was 38.78. The M/R for the PVB resin was 2.86, and tensile creep for the sheeting was 1.95.

Example 10

PVB resin was prepared as in Example 1 except for the changes outlined in Table 1: 34 parts of the 618 degree of polymerization PVA, 66 parts of the 1005 degree of polymerization PVA, 653 parts of demineralized water, and 1.3 parts of pTSA were used to make the dissolved PVA solution. Enough sulfuric acid was added to bring the reaction pH to 1.88; and 0.1 wt % of DOSS was used as the surfactant. A granular, white PVB resin with residual hydroxyl number of 19.38 was obtained. The PVB composition was formed as in Example 1 except that the plasticizer was 4G7. The resulting plasticizer content was 37.57. The M/R for the PVB resin was 2.9, and tensile creep for the sheeting was greater than 2.5.

Example 11

PVB resin was prepared as in Example 1 except for the changes outlined in Table 1: 34 parts of the 618 degree of polymerization PVA, 66 parts of the 1005 degree of polymerization PVA, 643 parts of demineralized water, and 1.3 parts of pTSA were used to make the dissolved PVA solution. Enough sulfuric acid was added to bring the reaction pH to 1.96; and 0.3 wt % of SLS was used as the surfactant. A granular, white PVB resin with residual hydroxyl number of 19.08 was obtained. The PVB composition was formed as in Example 1 except that the plasticizer was 4G7. The resulting plasticizer content was 36.58. The M/R for the PVB resin was 2.62, and tensile creep for the sheeting was greater than 2.5.

Example 12

PVB resin was prepared as in Example 1 except for the changes outlined in Table 1: 34 parts of the 618 degree of polymerization PVA, 66 parts of the 1005 degree of polymerization PVA, 649 parts of demineralized water, and 1.3 parts of pTSA were used to make the dissolved PVA solution; and 0.4 wt % of DOSS was used as the surfactant. A granular, white PVB resin with residual hydroxyl number of 18.87 was obtained. The PVB composition was formed as in Example 1 except that the plasticizer was 4G7. The resulting plasticizer content was 36.41. The M/R for the PVB resin was 3.32, and tensile creep for the sheeting was 1.61.

Example 13

PVB resin was prepared as in Example 1 except for the changes outlined in Table 1: 34 parts of the 618 degree of polymerization PVA, 66 parts of the 1005 degree of polymerization PVA, 617 parts of demineralized water, and 1.4 parts of pTSA were used to make the dissolved PVA solution; and 0.4 wt % of DOSS was used as the surfactant. A granular, white PVB resin with residual hydroxyl number of 18.66 was obtained. The M/R for the PVB resin was 3.6.

Example 14

PVB resin was prepared as in Example 1 except for the changes outlined in Table 1: 612 parts of demineralized water and 1.3 parts of pTSA were used in the dissolved PVA solution. A granular, white PVB resin with residual hydroxyl number of 19.17 was obtained. The M/R for the PVB resin was 3.62.

Example 15

PVB resin was prepared as in Example 1 except for the changes outlined in Table 1: 649 parts of demineralized water and 1.3 parts of pTSA were used in the dissolved PVA solution; and 0.15 wt % of DOSS was used as the surfactant. A granular, white PVB resin with residual hydroxyl number of 22.01 was obtained. The PVB composition was formed as in Example 1 except that the plasticizer was 4G7. Plasticizer was fed at 35-40 parts plasticizer to 100 parts PVB resin in the extruder. The M/R for the PVB resin was 3.45, and tensile creep for the sheeting was 1.33.

Example 16

PVB resin was prepared as in Example 1 except for the changes outlined in Table 1: 636 parts of demineralized water and 1.3 parts of pTSA were used in the dissolved PVA solution. A granular, white PVB resin with residual hydroxyl number of 21.92 was obtained. The PVB composition was formed as in Example 1 except that the plasticizer was 4G7. Plasticizer was fed at 35-40 parts plasticizer to 100 parts PVB resin in the extruder. The M/R for the PVB resin was 3.8, and tensile creep for the sheeting was 1.17.

Example 17

PVB resin was prepared as in Example 1 except for the changes outlined in Table 1: 610 parts of demineralized water were used in the dissolved PVA solution; and 0.33 wt % of COCO was used as the surfactant. A granular, white PVB resin with residual hydroxyl number of 19.66 was obtained. The PVB composition was formed as in Example 1. The resulting plasticizer content was 30.91. The M/R for the PVB resin was 3.25, and tensile creep for the sheeting was 1.50.

Example 18

PVB resin was prepared as in Example 1 except for the changes outlined in Table 1: 623 parts of demineralized water were used in the dissolved PVA solution; and only sulfuric acid was used as the acid catalyst. A granular, white PVB resin with residual hydroxyl number of 19.84 was obtained. The PVB composition was formed as in Example 1 with plasticizer fed at 35-40 parts plasticizer to 100 parts PVB resin in the extruder. The M/R for the PVB resin was 3.35, and tensile creep for the sheeting was 1.28.

Example 19

PVB resin was prepared as in Example 1 except for the changes outlined in Table 1: 649 parts of demineralized water and 1.3 parts of pTSA were used to make the dissolved PVA solution. Enough phosphoric acid was added to bring the reaction pH to 1.91. A granular, white PVB resin with residual hydroxyl number of 19.18 was obtained. The PVB composition was formed as in Example 1. The resulting plasticizer content was 30.46. The M/R for the PVB resin was 3.29, and tensile creep for the sheeting was 1.39.

Example 20

PVB resin was prepared as in Example 1 except for the changes outlined in Table 1: 649 parts of demineralized water and 1.3 parts of pTSA were used to make the dissolved PVA solution; enough phosphoric acid was added to bring the reaction pH to 1.91; and 0.33 wt % COCO was used as the surfactant. A granular, white PVB resin with residual hydroxyl number of 19.44 was obtained. The PVB composition was formed as in Example 1. The resulting plasticizer content was 32.20. The M/R for the PVB resin was 3.35, and tensile creep for the sheeting was 1.52.

Example 21

PVB resin was prepared as in Example 1 except for the changes outlined in Table 1: 612 parts of demineralized water were in the dissolved PVA solution and a two hour reaction hold time was used. A granular, white PVB resin with residual hydroxyl number of 18.18 was obtained. The M/R for the PVB resin was 3.62.

Example 22

PVB resin was prepared as in Example 1 except for the changes outlined in Table 1: 648 parts of demineralized water and 1 part of pTSA were in the dissolved PVA solution; and a two hour reaction hold time was used. A granular, white PVB resin with residual hydroxyl number of 19.07 was obtained. The PVB composition was formed as in Example 1 with plasticizer being fed at a 35-40 parts plasticizer to 100 parts PVB resin in the extruder. The M/R for the PVB resin was 3.63, and tensile creep for the sheeting was 1.35.

Example 23

PVB resin was prepared as in Example 1 except for the changes outlined in Table 1: Reaction temperature varied between 90 and 99.9° C. A granular, white PVB resin with residual hydroxyl number of 19.27 was obtained. The M/R for the PVB resin was 3.51.

Example 24

PVB resin was prepared as in Example 1 except for the changes outlined in Table 1: 649 parts of demineralized water was in the dissolved PVA solution; only sulfuric acid was used as an acid catalyst to get a reaction pH of 1.98; and a one hour and twenty minute reaction hold time was used. A granular, white PVB resin with residual hydroxyl number of 19.88 was obtained. The PVB composition was formed as in Example 11 with plasticizer fed at 35-40 parts plasticizer to 100 parts PVB resin in the extruder. The M/R for the PVB resin was 3.36, and tensile creep for the sheeting was 1.39.

Example 25

PVB resin was prepared as in Example 1 except for the changes outlined in Table 1: 34 parts of the 618 degree of polymerization PVA, 66 parts of the 1005 degree of polymerization PVA, 634 parts of demineralized water, and only pTSA was an acid catalyst were used to make the dissolved PVA solution; reaction pH was 1.85; and 0.15 wt % of SLS was used as the surfactant. A granular, white PVB resin with residual hydroxyl number of 22.65 was obtained. The PVB composition was formed as in Example 1 except that the plasticizer was 4G7. The resulting plasticizer content was 38.55. The M/R for the PVB resin was 2.48, and tensile creep for the sheeting was 1.39.

Example 26

PVB resin was prepared as in Example 1 except for the changes outlined in Table 1: 34 parts of the 618 degree of polymerization PVA, 66 parts of the 1005 degree of polymerization PVA, 645 parts of demineralized water, and 1.3 parts pTSA were used to make the dissolved PVA solution; reaction pH was 1.92; 0.35 wt % of DOSS was used as the surfactant; and reaction hold time was 30 minutes. A granular, white PVB resin with residual hydroxyl number of 19.29 was obtained. The PVB composition was formed as in Example 1 except that the plasticizer was 4G7. The resulting plasticizer content was 37.09. The M/R for the PVB resin was 3.39, and tensile creep for the sheeting was 1.54.

Example 27

PVB resin was prepared as in Example 1 except for the changes outlined in Table 1: 34 parts of the 618 degree of polymerization PVA, 66 parts of the 1005 degree of polymerization PVA, 594 parts of demineralized water, and 1.4 parts of pTSA were used to make the dissolved PVA solution; enough sulfuric acid was added to get a reaction pH of 1.48; reaction temperature ranged from 83 to 90.1° C.; and 0.30 wt % of DOSS was used as the surfactant. A granular, white PVB resin with residual hydroxyl number of 18.37 was obtained. The M/R for the PVB resin was 3.23.

Example 28

PVB resin was prepared as in Example 1 except for the changes outlined in Table 1: 34 parts of the 618 degree of polymerization PVA, 66 parts of the 1005 degree of polymerization PVA, 594 parts of demineralized water, and 1.4 parts of pTSA were used to make the dissolved PVA solution; enough sulfuric acid was added to get a reaction pH of 1.48; reaction temperature ranged from 82 to 90.3° C. and 0.60 wt % of DOSS was used as the surfactant. A granular, white PVB resin with residual hydroxyl number of 18.02 was obtained. The M/R for the PVB resin was 3.37.

Example 29

PVB resin was prepared as in Example 1 except for the changes outlined in Table 1: 501 parts of demineralized water and 1.4 parts of pTSA plus 0.1 part $H_3PO_4$ were used to make the dissolved PVA solution; enough sulfuric acid was added to get a reaction pH of 1.55; reaction temperature ranged from 83.8 to 90.2° C. and 0.30 wt % of DOSS was used as the surfactant. A granular, white PVB resin with residual hydroxyl number of 18.73 was obtained. The M/R for the PVB resin was 3.33.

Example 30

PVB resin was prepared as in Example 1 except for the changes outlined in Table 1: 501 parts of demineralized water and 1.4 parts of pTSA plus 0.1 part $H_3PO_4$ were used to make the dissolved PVA solution; enough sulfuric acid was added to get a reaction pH of 1.55; reaction temperature ranged from 83.3 to 90.3° C. and 0.30 wt % of DOSS was used as the surfactant. A granular, white PVB resin with residual hydroxyl number of 18.58 was obtained. The M/R for the PVB resin was 3.25.

Example 31

PVB resin was prepared as in Example 1 except for the changes outlined in Table 1: 461 parts of demineralized water and 1.4 parts of pTSA plus 0.1 part $H_3PO_4$ were used to make the dissolved PVA solution; enough sulfuric acid was added to get a reaction pH of 1.50; reaction temperature ranged from 82.2 to 89.9° C. and 0.30 wt % of DOSS was used as the surfactant. A granular, white PVB resin with residual hydroxyl number of 15.74 was obtained. The M/R for the PVB resin was 2.94.

Example 32

PVB resin was prepared as in Example 1 except for the changes outlined in Table 1: 461 parts of demineralized water and 1.4 parts of pTSA plus 0.1 part $H_3PO_4$ were used to make the dissolved PVA solution; enough sulfuric acid was added to get a reaction pH of 1.50; reaction temperature ranged from 83.1 to 90.1° C. and 0.60 wt % of DOSS was used as the surfactant. A granular, white PVB resin with residual hydroxyl number of 17.32 was obtained. The M/R for the PVB resin was 3.37.

Example 33

PVB resin was prepared as in Example 1 except for the changes outlined in Table 1: 461 parts of demineralized water and 1.4 parts of pTSA plus 0.1 part $H_3PO_4$ were used to make the dissolved PVA solution; enough sulfuric acid was added to get a reaction pH of 1.52; reaction temperature ranged from 82.6 to 89.8° C. and 0.30 wt % of DOSS was used as the surfactant. A granular, white PVB resin with residual hydroxyl number of 24.11 was obtained. The M/R for the PVB resin was 3.98.

Example 34

PVB resin was prepared as in Example 1 except for the changes outlined in Table 1: 461 parts of demineralized water and 1.4 parts of pTSA plus 0.1 part $H_3PO_4$ were used to make the dissolved PVA solution; enough sulfuric acid was added to get a reaction pH of 1.52; reaction temperature ranged from 82.3 to 90.1° C. and 0.30 wt % of DOSS was used as the surfactant. A granular, white PVB resin with residual hydroxyl number of 21.64 was obtained. The M/R for the PVB resin was 3.56.

Example 35

PVB resin was prepared as in Example 1 except for the changes outlined in Table 1: 0 parts of the 618 degree of polymerization PVA, 100 parts of the 1005 degree of polymerization PVA, 630 parts of demineralized water, and 1.4 parts of pTSA plus 0.1 part $H_3PO_4$ were used to make the dissolved PVA solution; enough sulfuric acid was added to get a reaction pH of 1.59; reaction temperature ranged from 84.4 to 90.1° C. and 0.60 wt % of DOSS was used as the surfactant. A granular, white PVB resin with residual hydroxyl number of 17.32 was obtained. The M/R for the PVB resin was 3.18.

Example 36

PVB resin was prepared as in Example 1 except for the changes outlined in Table 1: 0 parts of the 618 degree of polymerization PVA, 100 parts of the 1005 degree of polymerization PVA, 630 parts of demineralized water, and 1.4 parts of pTSA plus 0.1 part $H_3PO_4$ were used to make the dissolved PVA solution; enough sulfuric acid was added to get a reaction pH of 1.59; reaction temperature ranged from 81.1 to 90.2° C. and 0.30 wt % of DOSS was used as the surfactant. A granular, white PVB resin with residual hydroxyl number of 17.63 was obtained. The M/R for the PVB resin was 3.05.

Example 37

PVB resin was prepared as in Example 1 except for the changes outlined in Table 1: 100 parts of the 618 degree of polymerization PVA, 0 parts of the 1005 degree of polymerization PVA, 630 parts of demineralized water, and 1.4 parts of pTSA plus 0.1 part $H_3PO_4$ were used to make the dissolved PVA solution; enough sulfuric acid was added to get a reaction pH of 1.60; reaction temperature ranged from 83.8 to 90.1° C. and 0.60 wt % of DOSS was used as the surfactant. A granular, white PVB resin with residual hydroxyl number of 19.44 was obtained. The M/R for the PVB resin was 3.89.

Example 38

PVB resin was prepared as in Example 1 except for the changes outlined in Table 1: 100 parts of the 618 degree of polymerization PVA, 0 parts of the 1005 degree of polymerization PVA, 630 parts of demineralized water, and 1.4 parts of pTSA plus 0.1 part $H_3PO_4$ were used to make the dissolved PVA solution; enough sulfuric acid was added to get a reaction pH of 1.60; reaction temperature ranged from 82.6 to 90.1° C. and 0.30 wt % of DOSS was used as the surfactant. A granular, white PVB resin with residual hydroxyl number of 18.12 was obtained. The M/R for the PVB resin was 3.38.

Example 39

PVB resin was prepared as in Example 1 except for the changes outlined in Table 1: 718 parts of demineralized water and 1.4 parts of pTSA plus 0.1 part $H_3PO_4$ were used to make the dissolved PVA solution; enough sulfuric acid was added to get a reaction pH of 1.57; reaction temperature ranged from 84.1 to 90.0° C. and 0.60 wt % of DOSS was used as the surfactant. A granular, white PVB resin with residual hydroxyl number of 16.5 was obtained. The M/R for the PVB resin was 3.29.

Example 40

PVB resin was prepared as in Example 1 except for the changes outlined in Table 1: 718 parts of demineralized water and 1.4 parts of pTSA plus 0.1 part $H_3PO_4$ were used to make the dissolved PVA solution; enough sulfuric acid was added to get a reaction pH of 1.57; reaction temperature ranged from 84.4 to 90.1° C. and 0.60 wt % of DOSS was used as the surfactant. A granular, white PVB resin with residual hydroxyl number of 16.66 was obtained. The M/R for the PVB resin was 3.16.

The invention claimed is:

1. A plasticized polyvinylbutyral composition comprising (a) a polyvinylbutyral resin having a hydroxyl number of from about 15 to about 34 and comprising cyclic acetals in a mixture of meso and racemic stereoisomers, wherein the ratio of meso to racemic stereoisomers (M/R) is in the range of from about 3.1 to about 3.5; (b) a surfactant; and (c) a plasticizer in an amount of from about 30 to about 50 parts per hundred (pph) based on the dry weight of the polyvinylbutyral resin;
wherein a sheet consisting of the plasticized polyvinylbutyral composition has a tensile creep is from 1.17 to 3.0.

2. The plasticized polyvinylbutyral composition of claim 1 wherein the surfactant is selected from the group consisting of sodium dioctylsulfosuccinate, sodium methyl cocoyl taurate, sodium lauryl sulfate, and a combination of two or more of sodium dioctylsulfosuccinate, sodium methyl cocoyl taurate and sodium lauryl sulfate.

3. The plasticized polyvinylbutyral composition of claim 2 wherein the polyvinylbutyral resin has a hydroxyl number of from about 17 to about 19.

4. The plasticized polyvinylbutyral composition of claim 3 wherein the tensile creep is less than or equal to 2.5.

5. The plasticized polyvinylbutyral composition of claim 4 wherein the tensile creep is less than or equal to 1.5.

6. The plasticized polyvinylbutyral composition of claim 2 wherein the surfactant comprises sodium lauryl sulfate.

7. The plasticized polyvinylbutyral composition of claim 2 wherein the surfactant comprises sodium dioctylsulfosuccinate.

8. The plasticized polyvinylbutyral composition of claim 2 wherein the surfactant consists essentially of sodium methyl cocoyl taurate.

9. The plasticized polyvinylbutyral composition of claim 2 wherein the amount of the surfactant is at least 0.1 wt %, based on the dry weight of a polyvinyl alcohol from which the polyvinylbutyral resin is derived.

10. The plasticized polyvinylbutyral composition of claim 9 wherein the amount of the surfactant is about 0.10 to about 0.70 wt %.

11. The plasticized polyvinylbutyral composition of claim 9 wherein the amount of the surfactant is about 0.20 to about 0.50 wt %.

12. The plasticized polyvinylbutyral composition of claim 2 wherein the polyvinylbutyral resin is derived from a polyvinyl alcohol having a degree of polymerization of about 618 or about 1005.

13. The plasticized polyvinylbutyral composition of claim 1 further comprising one or more additives selected from the group consisting of antioxidants, light stabilizers, adhesion control agents, and surface tension controlling agents.

14. The plasticized polyvinylbutyral composition of claim 1 comprising about 32 to about 45 pph of the plasticizer.

15. The plasticized polyvinylbutyral composition of claim 1 wherein the plasticizer is selected from the group consisting of diesters obtained from the chemical reaction of aliphatic diols with carboxylic acids, esters obtained from the chemical reaction polyvalent carboxylic acids and aliphatic alcohols, and combinations of two or more of these esters and diesters.

16. The plasticized polyvinylbutyral composition of claim 15 wherein the plasticizer comprises one or more diesters of polyether diols or diesters of polyether polyols.

17. The plasticized polyvinylbutyral composition of claim 15 wherein the plasticizer comprises one or more of diesters obtained by the reaction of triethylene glycol or tetraethylene glycol with aliphatic carboxylic acids having from 6 to 10 carbon atoms; and diesters obtained from the reaction of sebacic acid with aliphatic alcohols having from 1 to 18 carbon atoms.

18. The plasticized polyvinylbutyral composition of claim 17 wherein the plasticizer comprises one or more of triethyleneglycol di-(2-ethyl hexanoate) (3GO), dibutyl sebacate (DBS) and tetraethylene glycol di(2-heptanoate) (4G7).

* * * * *